April 11, 1944.     L. E. BORDER ET AL     2,346,550
PRODUCTION OF CONCENTRATED SODIUM HYDROSULPHIDE SOLUTIONS
Filed Aug. 9, 1940     4 Sheets-Sheet 1
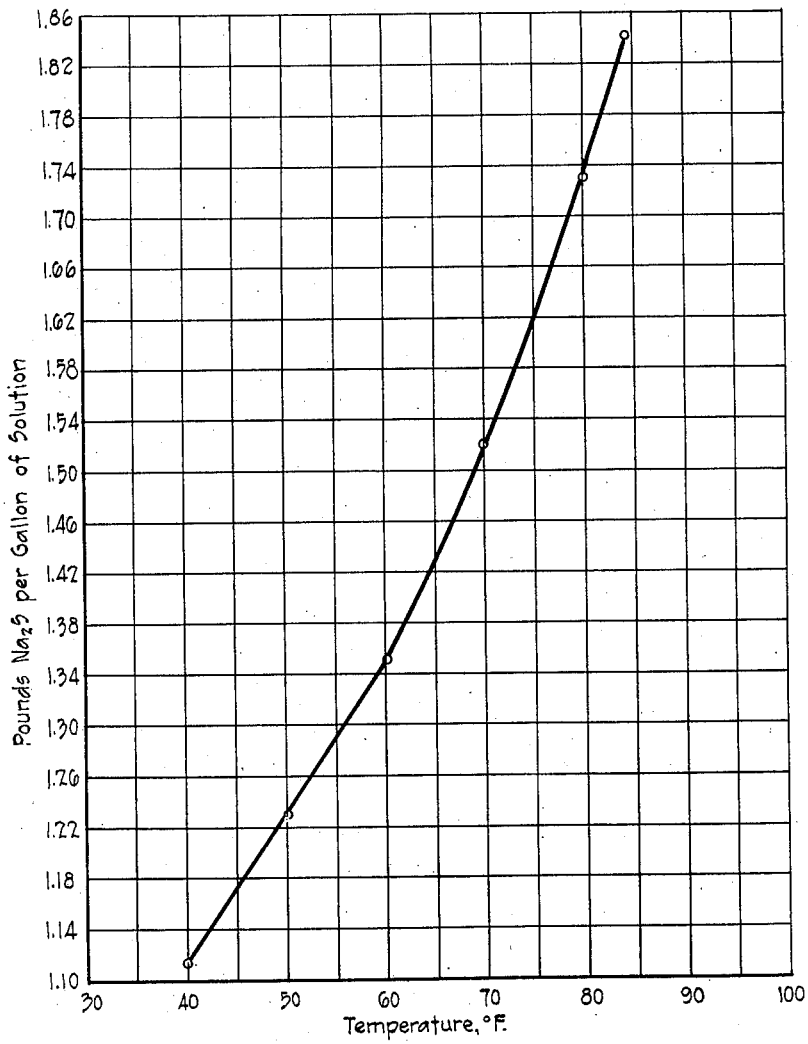
SOLUBILITY OF $Na_2S$
(CALCULATED FROM DATA IN INTERNATIONAL CRITICAL TABLES)
FIG. I
Inventors: Lawson E. Border
Edwin T. Gerhart
By their Attorney:

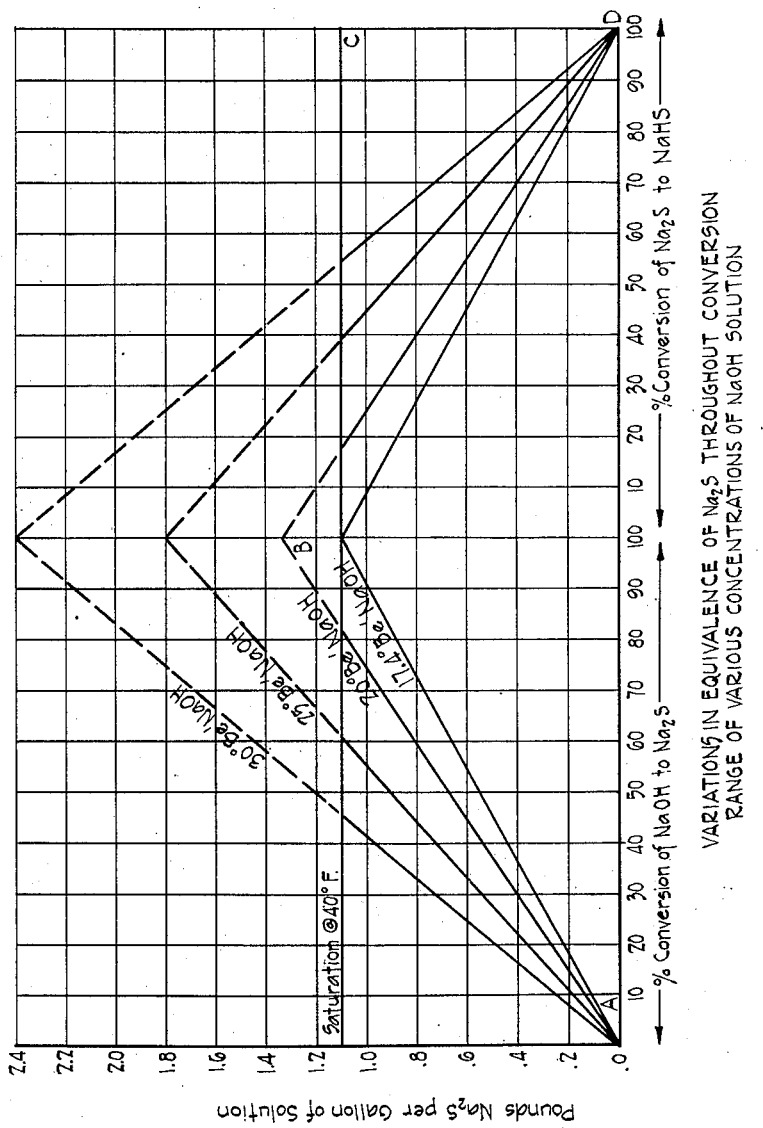

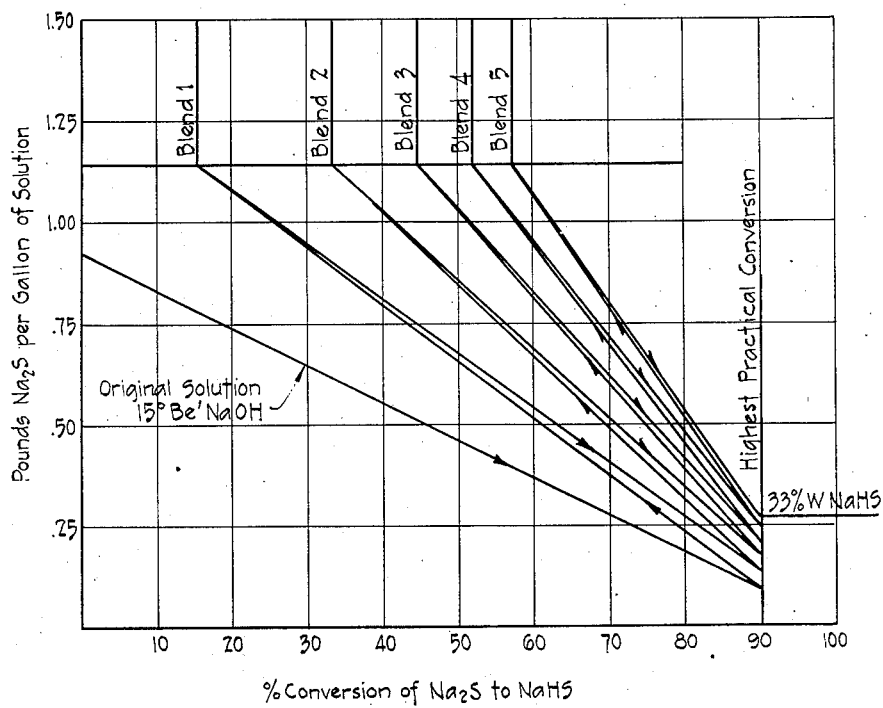
DIAGRAMMATIC COURSE OF ABSORPTION AND BLENDING CYCLES IN PREPARING 33% W NaHS SOLUTION FROM 15° Be' NaOH SOLUTION WHEN USING 50° Be' NaOH SOLUTION FOR BLENDING
FIG. III
Inventors: Lawson E. Border
Edwin T. Gerhart
By their Attorney:

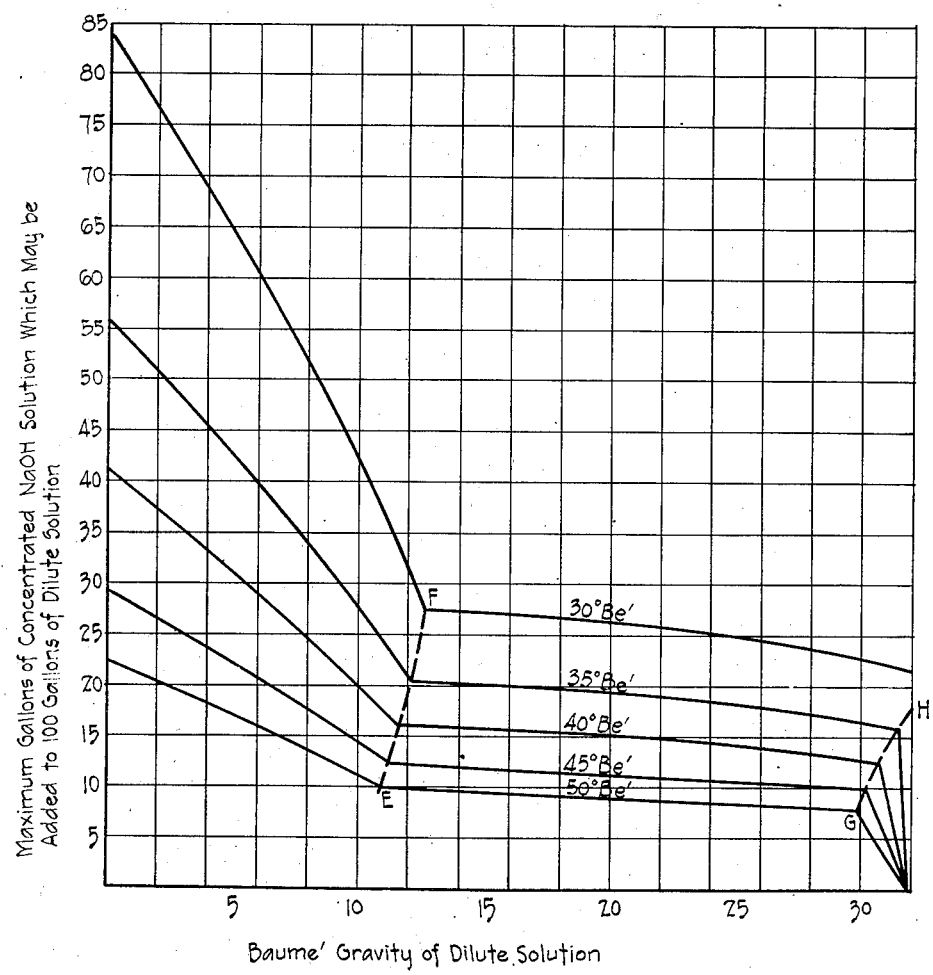
MAXIMUM VOLUME OF CONCENTRATED NaOH SOLUTION WHICH MAY BE ADDED TO 100 GALLONS OF 90% CONVERTED WEAK SOLUTION @ 40°F.
FIG. IV Patented Apr. 11, 1944

2,346,550

UNITED STATES PATENT OFFICE 2,346,550

PRODUCTION OF CONCENTRATED SODIUM HYDROSULPHIDE SOLUTIONS

Lawson E. Border, Wood River, and Edwin T. Gerhart, Edwardsville, Ill., assignors to Shell Development Company, San Francisco, Calif., a corporation of Delaware Application August 9, 1940, Serial No. 351,992

9 Claims. (Cl. 23—134)

This invention relates to the production of alkali hydrosulphides and especially to the production of concentrated sodium hydrosulphide solutions by absorption of hydrogen sulphide from refinery gases with sodium hydroxide.

Sodium hydrosulfide is frequently used as a reducing agent in some of the chemical industries, particularly in the dye-stuffs industries. Preparation of this salt in dilute solution (5 to 10% by weight) requires no special technique, as it is commonly a product of the absorption of hydrogen sulphide from refinery products or caustic soda. However, because of excessive transportation costs for dilute solution, it is necessary to produce it in concentrated form in order for its production to be profitable. This requires special technique in order to prevent precipitation of the intermediate salt, sodium sulfide ($Na_2S$). Although the data presented herein deals specifically with the production of a solution containing 33% by weight of sodium hydrosulfide, the principle involved can be applied for the production of other concentrations as well. When sodium hydrosulfide is prepared by reaction of sodium hydroxide and hydrogen sulphide the following two reactions take place:

(1)      $2NaOH + H_2S \rightarrow Na_2S + 2H_2O$
(2)      $Na_2S + H_2S \rightarrow 2NaHS$ NaOH and NaHS cannot exist together in solution. As corrollaries, it may be stated that Reaction 2 does not begin until Reaction 1 is completed and that by adding less than the equivalent amount of NaOH to a solution of NaHS, NaHS equivalent to the NaHO is consumed in the formation of $Na_2S$.

It is an object of the present invention to provide a method for preparing concentrated sodium hydrosulphide solutions by the above reactions without precipitation of sodium sulphide. Another object is to provide an easily controlled method for such preparation that may be carried out in a continuous manner in standard, easily available equipment. Further, it is an object to provide means for precalculating the conditions of the various steps of the process as applied to the preparation of any desired concentration of sodium hydrosulphide solution.

In the accompanying drawings:

Figure I is 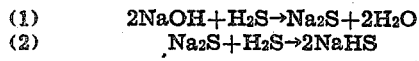 a plot showing the solubility of sodium sulphide in water at various temperatures.

Figure II is a plot showing the variations in equivalence of sodium sulphide throughout the conversion range of various concentrations of sodium hydroxide solution.

Figure III is a reproduction of the right half of Figure II on a larger scale and diagrammatically shows the course of absorption and blending cycles in preparing 33% sodium hydrosulphide solution from 15° Bé. sodium hydroxide solution when using 50° Bé. sodium hydroxide solution for blending.

Figure IV is a plot showing the maximum volume of various concentrated sodium hydroxide solutions which may be added to 100 gallons of 90% converted sodium hydrosulfide solution at 40° F. without precipitating sodium sulphide.

The solubility of $Na_2S$ is relatively low (see Figure I). For this reason it is not possible to begin with, say, a 30° Bé. caustic solution and convert it directly to NaHS by absorption of $H_2S$ without precipitating $Na_2S$ as an intermediate product. This is shown in Figure II. A 30° Bé. solution of caustic soda contains NaOH equivalent to 2.4 pounds of $Na_2S$ per gallon which greatly exceeds the solubility of $Na_2S$ at 40° F. (This temperature was chosen for calculating the data shown herein to insure absence of crystallization in the preferred method of operation in a scrubber in which the minimum temperature is about 60° F.) In other words, in order to prepare a concentrated solution containing approximately 30% by weight sodium hydrosulphide in one step by reaction of NaOH with $H_2S$, without precipitating $Na_2S$, a temperature in excess of approximately 100° F. must be utilized, since a 30° Bé. NaOH solution (which would be necessary to produce the desired concentrated NaHS solution) would yield 2.4 pounds of $Na_2S$ per gallon of solution (Figure II), whereas the solubility of $Na_2S$ is less than approximately 2.3 pounds per gallon of solution (International Critical Tables). Figure II also shows a 17.4° Bé. caustic soda solution would be saturated with $Na_2S$ at 40° F. if all of the NaOH were converted to $Na_2S$.

The preparation of a dilute NaHS solution with subsequent concentration by evaporation requires special low pressure evaporating equipment to minimize $H_2S$ losses since the vapor pressure of $H_2S$ over a solution in which 90% of the sodium ion exists as NaHS is appreciable.

For example, the $H_2S$ losses in concentrating a 90% converted NaHS solution from 10% by weight to 33% by weight by evaporation at atmospheric pressure are approximately 15% of the sulphide content, making this method uneconomical.

According to the present invention it is possible to circumvent the low solubility of $Na_2S$ in preparing solutions of NaHS whose concentrations exceed that equivalent to the NaOH in a 17.4° Bé. solution. A 17.4° Bé. solution of NaOH will yield a solution containing approximately 20% by weight of NaHS when reacted according to the equations above if the conversion of Na₂S to NaHS in Equation 2 is raised to approximately 90%, as is explained below. It is necessary in order to do so to operate within the area ABCD of Figure II; to accomplish this it is necessary to begin with a NaOH solution of 17.4° Bé. or less, convert a high percentage of the NaOH to NaHS by absorbing H₂S and then add concentrated NaOH solution, after which more H₂S is again added. This cycle is repeated until the desired concentration of NaHS has been obtained. As an alternative, concentrated NaOH may be added continuously to any NaHS solution, concurrently with the absorption of H₂S in the system, at such a rate that the concentration of Na₂S is always maintained less than its solubility limit at the lowest temperature existing in the system. Each addition of the concentrated NaOH solution decreases the amount of NaHS in the system by forming Na₂S which then has a capacity of absorbing more H₂S. Each addition of concentrated NaOH, of course, increases the sodium ion concentration in the solution so that the final NaHS content may be increased to the desired amount by the proper number of repetitions of the cycle. In order to obtain the desired NaHS concentration in the least number of cycles, the conversion of Na₂S to NaHS should be raised to approximately 90% each time. Conversions above 90% are not normally practical in a refinery gas scrubbing system because of equilibrium conditions which allow excessive quantities of H₂S in the exit gas. The maximum amount of concentrated NaOH solution which may be added each time to the solution containing NaHS without precipitating Na₂S may be calculated by Equation (1) below, $$(1) \qquad \frac{40}{32}[T(1+x) - P] = Rx$$

wherein $\frac{40}{32}$ = the stoichiometric factor for calculating NaOH equivalent to sulphur in the reaction $NaHS + NaOH \rightarrow Na_2S + H_2O$.

T = pounds of sulphide sulphur per gallon in a saturated solution of Na₂S at the operating temperature.

x = maximum volume (gallons) concentrated NaOH solution which may be added to each gallon of dilute solution in which a known amount of the Na₂S has been converted to NaHS.

P = pounds of sulphide sulphur (as Na₂S) in each gallon of dilute solution in which a known amount of the Na₂S has been converted to NaHS.

R = pounds of NaOH per gallon of concentrated NaOH solution used for blending.

The application of this equation assumes no decrease in the solubility of Na₂S by the presence of NaHS, no change in the volume of the solution by H₂S absorption, and that the total volume after blending NaHS and NaOH solutions equals the sums of the two volumes blended. These assumptions, although not strictly valid, are satisfactory for practical purposes.

The calculated course of a typical blending procedure for producing a 33% by weight NaHS solution starting with 15° Bé. NaOH solution, adding sufficient H₂S to convert 90% of the Na₂S to NaHS and using 50° Bé. NaOH solution for blending, is shown in Table I. These data are plotted in Figure III. It so happens that in this particular case the desired concentration may be prepared by five repetitions of the absorption and blending cycle as calculated by Equation 1. Usually, in order to have the final blend result in a specified concentration it is necessary to use Equation 2 below:

$$(2) \qquad M + Rx = N(1+x)$$

wherein

M = pounds of NaOH equivalent per gallon of dilute solution.

R = same as in Equation 1, pounds of NaOH per gallon of concentrated NaOH.

x = gallons of concentrated NaOH solution to be added to each gallon of dilute solution to produce a blend of limiting NaOH equivalent.

N = pounds of NaOH equivalent per gallon desired in blended solution.

Thus, to obtain a desired specified concentration of sodium hydrosulphide in solution, hydrogen sulphide and sodium hydroxide solution are reacted to form a dilute sodium hydrosulphide solution, the concentration of the sodium hydroxide used being sufficiently low so that insufficient quantities of the intermediate salt (sodium sulphide) are formed to precipitate at the operating temperature. Concentrated sodium hydroxide solution (the quantity being determined by Equation 1) is then reacted with the dilute sodium hydrosulphide solution to form a solution containing sodium sulphide, which is in turn reacted with more hydrogen sulphide to form a sodium hydrosulphide solution of higher concentration.

This cycle is repeated until, by analysis, it is determined that further repetition of the cycle will produce a sodium hydrosulphide solution of greater concentration than that desired. At this point the quantity of concentrated sodium hydroxide solution to be added is determined by Equation 2 and as a result the quantity of sodium sulphide formed will be sufficient, when further reacted with hydrogen sulphide, to produce a sodium hydrosulphide solution of the desired concentration.

TABLE I

Calculated course of blending procedure in preparing 33% by weight NaHS solution from 15° Bé. NaOH solution. Showing maximum allowable volume of 50° Bé. NaOH solution which may be added each time

| Blend number | Gravity of equivalent NaOH solution after each addition of maximum volume of 50° Bé. NaOH solution, °Baumé | Maximum gallons of 50° Bé. NaOH solution which may be added to each 100 gallons | Pounds Na₂S per gallon after blending |
|---|---|---|---|
| Original | 15 | 9.3 | 1.11 |
| 1 | 20.1 | 8.9 | 1.11 |
| 2 | 24.3 | 8.6 | 1.11 |
| 3 | 27.4 | 8.3 | 1.11 |
| 4 | 29.8 | 8.1 | 1.11 |
| 5 | 31.9 | | |

By means of Equations 1 and 2 the maximum quantities of concentrated NaOH solutions, ranging from 30 to 50° Bé., which may be added to dilute solutions ranging from 0 to 31.9° Bé. without precipitating Na₂S (40° F. basis) have been calculated. These calculated quantities are shown in Table II, and plotted in Figure IV. By interpolating on this figure it is possible to determine the maximum quantities of concentrated NaOH solution which may be added to 100 gallons of dilute solution for any combination of concentrations within the range shown. All combinations of conditions to the left of line EF in Figure IV are calculated by Equation 2 which determines the quantity of concentrated NaOH solution which, when blended with the dilute solution, will produce a solution whose Na₂S content will not exceed the Na₂S equivalent of a 17.4° Bé. NaOH solution. Likewise, Equation 2 determines all quantities to the right of line GH (Figure IV) which will produce a solution containing NaHS equivalent to 33% by weight when 90% of the Na₂S is converted to NaHS. The curves between EF and GH, Figure IV, are determined by Equation 1.

TABLE II

*Maximum gallons of concentrated NaOH solution which may be added to each 100 gallons of dilute solution without precipitating Na₂S*

| Baumé gravity of dilute solution | Baumé gravity of concentrated NaOH solution | | | | |
|---|---|---|---|---|---|
| | 30 | 35 | 40 | 45 | 50 |
| | (Maximum gallons per 100 gallons) | | | | |
| 4 | 69.0 | 45.0 | 33.1 | 23.8 | 18.1 |
| 8 | 50.7 | 33.2 | 24.4 | 17.5 | 13.3 |
| 12 | 31.1 | 20.3 | 16.0 | 12.3 | 9.8 |
| 14 | 27.7 | 20.2 | 15.8 | 12.0 | 9.4 |
| 18 | 26.8 | 19.5 | 15.3 | 11.6 | 9.1 |
| 22 | 26.0 | 19.0 | 14.9 | 11.2 | 8.8 |
| 26 | 24.7 | 18.0 | 14.1 | 10.7 | 8.4 |
| 29 | | | 16.9 | 13.2 | 10.2 | 8.2 |
| 30 | | | 16.6 | 12.9 | 10.1 | 7.2 |
| 31 | | | 16.2 | 8.6 | 5.0 | 3.2 |

The control of the process consists essentially in periodically determining the percentage conversion of the Na₂S to NaHS and the gravity of the solution. The percentage conversion of Na₂S may be conveniently determined by a double indicator titration as follows:

(1) Approximately 2 c. c. of sample (accurate measurement unnecessary) is diluted to about 20 c. c. with distilled water.

(2) This diluted sample is then titrated with standard 0.5 N acid, using thymol blue indicator, to color change from blue to yellow (phenolphthalein may be substituted for thymol blue). The volume of acid required is designated as A in the Equation 4 below.

(3) Methyl orange indicator is then added to the same sample and the titration continued to color change from orange to pink. The total volume of acid required is designated as B in Equation 4.

Equation 4

$$\text{Percent conversion} = \frac{B - 2A}{B} \times 100$$

We claim as our invention:

1. In a method of preparing concentrated sodium hydrosulphide solution containing at least approximately 30% by weight sodium hydrosulphide by reaction of aqueous sodium hydroxide solution and hydrogen sulphide, the steps comprising (1) reacting hydrogen sulphide and sodium hydroxide solution to form a sodium hydrosulphide solution containing at least approximately 20% by weight of sodium hydrosulphide according to the reactions $$2NaOH + H_2S \rightarrow Na_2S + 2H_2O$$

and $$Na_2S + H_2S \rightarrow 2NaHS$$

the concentration of said sodium hydroxide solution not exceeding that at which sufficient sodium sulphide is formed in the first reaction to exceed the solubility of sodium sulphide in the resultant solution at the operating temperature, said temperature being between approximately 40° F. and 100° F., (2) adding a concentrated sodium hydroxide solution to said first sodium hydrosulphide solution continuously with the absorption of H₂S at a rate less than that which causes an initial precipitation of sodium sulphide at the lowest temperature encountered in the system, and (3) having obtained any desired equivalent sodium hydroxide concentration, adding hydrogen sulphide to any percent conversion of Na₂S to NaHS desired.

2. The process according to claim 1 wherein the percent conversion of Na₂S to NaHS is maintained within the limits of 20%-95% while adding the concentrated sodium hydroxide solution and hydrogen sulphide concurrently.

3. In a method for preparing concentrated sodium hydrosulphide solutions containing more than at least approximately 20% by weight of sodium hydrosulphide, the steps comprising reacting hydrogen sulphide with sodium hydroxide solution of a concentration such that the sodium sulphide equivalent does not exceed the solubility of sodium sulphide at the operating temperature and a solution containing at least approximately 20% by weight of sodium hydrosulphide is formed, said temperature being between approximately 40° F. and 100° F., reacting said sodium hydrosulphide solution with sodium hydroxide solution of a concentration greater than the original sodium hydroxide solution to form a solution containing sodium sulphide, the quantity of concentrated sodium hydroxide solution added being less than that which causes an initial precipitation of sodium sulphide at the operating temperature and reacting said last named solution with hydrogen sulphide to form sodium hydrosulphide solution, the potential concentration of sodium hydrosulphide in said last named sodium hydrosulphide solution being greater than the sodium hydrosulphide equivalent of the original sodium hydroxide solution.

4. In a method for preparing relatively concentrated sodium hydrosulphide solutions by reaction of aqueous sodium hydroxide solution and hydrogen sulphide, the steps comprising (1) reacting hydrogen sulphide with sodium hydroxide solution of sufficient concentration to form a sodium hydrosulphide solution containing at least approximately 20% by weight of sodium hydrosulphide according to the reactions $$2NaOH + H_2S \rightarrow Na_2S + 2H_2O$$

and $$Na_2S + H_2S \rightarrow 2NaHS$$

the concentration of said sodium hydroxide solution not exceeding that at which sufficient sodium sulphide is formed in the first reaction to exceed the solubility of sodium sulphide in the reaction product at the operating temperature, said temperature being between approximately 40° F. and 100 F.; (2) reacting said sodium hydrosulphide solution with a concentrated sodium hydroxide solution to form a solution containing sodium sulphide, the quantity of concentrated sodium hydroxide solution added being less than that which causes an initial precipitation of sodium sulphide at the operating temperature; and (3) reacting said sodium sulphide containing solution with sufficient hydrogen sulphide to convert at least a sufficient portion of said sodium sulphide to sodium hydrosulphide to produce a sodium hydrosulphide solution having a higher sodium hydrosulphide concentration than that obtained in step 1.

5. The method according to claim 4 wherein steps 2 and 3 are consecutively repeated, in each repetition using the sodium hydrosulphide solution obtained from the third step of the previous series of steps as a starting material, thereby forming a highly concentrated sodium hydrosulphide solution.

6. In a method for further concentrating a solution containing at least approximately 20% by weight of sodium hydrosulphide, the steps comprising reacting said sodium hydrosulphide solution with sodium hydroxide solution of a concentration higher than that equivalent to said sodium hydrosulphide solution to form a solution containing sodium sulphide, the quantity of sodium hydroxide added being less than that which causes an initial precipitation of sodium sulphide at the operating temperature, and reacting said sodium sulphide containing solution with hydrogen sulphide to form sodium hydrosulphide solution, the potential concentration of sodium hydrosulphide in said last named solution being greater than the sodium hydrosulphide concentration of said original sodium hydrosulphide solution.

7. In a method for further concentrating a solution containing at least approximately 20% by weight of sodium hydrosulphide, the steps comprising (1) reacting said sodium hydrosulphide solution with sodium hydroxide solution of a concentration higher than that equivalent to said sodium hydrosulphide solution to form a solution containing sodium sulphide, the quantity of sodium hydroxide added being less than that which causes an initial precipitation of sodium sulphide at the operating temperature, said temperature being between approximately 40° F. and approximately 100° F.; (2) reacting said sodium sulphide containing solution with hydrogen sulphide to form a sodium hydrosulphide solution of greater concentration than said original sodium hydrosulphide solution; and (3) consecutively repeating steps 1 and 2, in each repetition using the sodium hydrosulphide solution obtained from the second step of the previous series of steps as a starting material, thereby forming a highly concentrated sodium hydrosulphide solution.

8. In a method for further concentrating a solution containing at least approximately 20% by weight of sodium hydrosulphide, the steps comprising adding a sodium hydroxide solution of a concentration higher than that equivalent to said sodium hydrosulphide solution to said sodium hydrosulphide solution continuously with the absorption of hydrogen sulphide, the quantities of sodium hydroxide added being less than that which causes a precipitation of sodium sulphide at the operating temperature, said temperature being between approximately 40° F. and approximately 100° F., and having obtained any desired equivalent sodium hydroxide concentration, adding hydrogen sulphide to obtain the desired percent conversion of sodium sulphide to sodium hydrosulphide.

9. The process according to claim 8 wherein the percent conversion of sodium sulphide to sodium hydrosulphide is maintained within the limits of approximately 20% to approximately 95% while adding the sodium hydroxide and hydrogen sulphide concurrently.

LAWSON E. BORDER.
EDWIN T. GERHART.